Patented May 26, 1925.

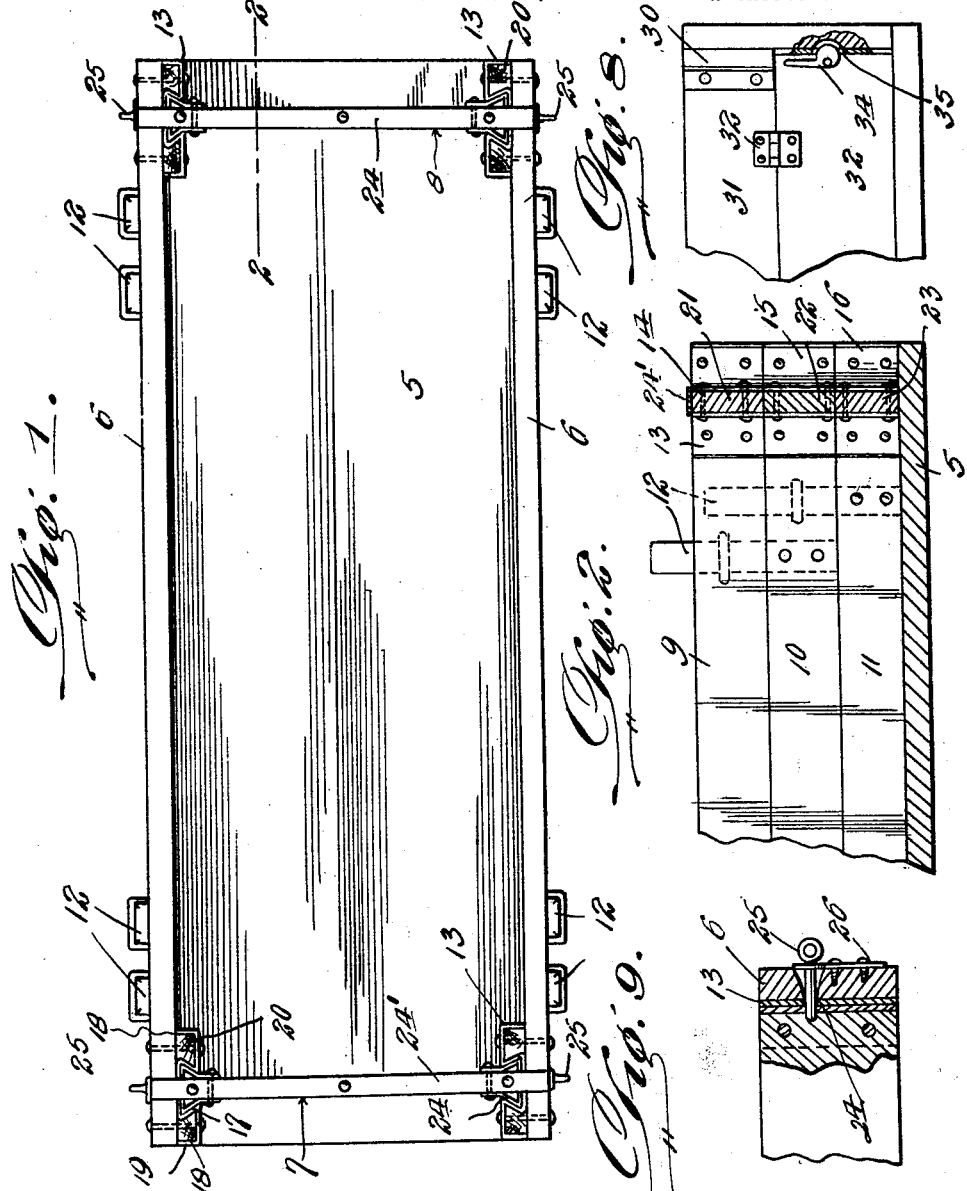

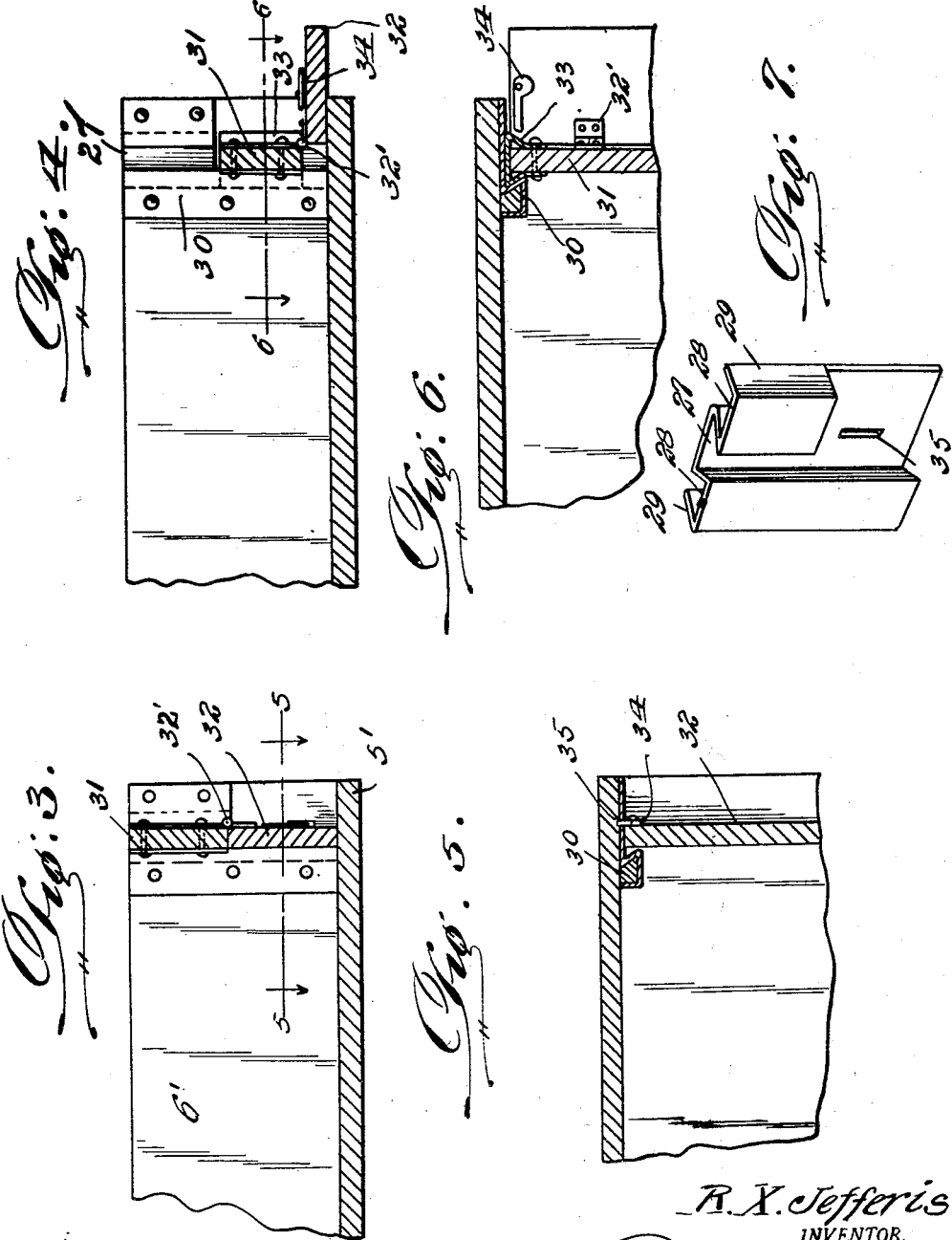

1,539,492

UNITED STATES PATENT OFFICE.

RALPH X. JEFFERIS, OF MILLBORO, SOUTH DAKOTA.

FRONT AND REAR END GATE FOR WAGON BOXES.

Application filed January 22, 1923. Serial No. 614,079.

*To all whom it may concern:*

Be it known that I, RALPH X. JEFFERIS, a citizen of the United States, residing at Millboro, in the county of Tripp and State of South Dakota, have invented certain new and useful Improvements in Front and Rear End Gates for Wagon Boxes, of which the following is a specification.

The primary object of my said invention is the provision of front and rear end gates for wagon boxes, wherein the usual end gate box rods may be dispensed with and by means of which a great saving of time is had in removing either of the end gates.

A further object of my invention resides in the provision of such a device, wherein either of the end gates may be quickly removed and which end gates when in place, will effectively provide a means for preventing any bulging of the side boards of the wagon box when the same is loaded.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1—is a top plan view of one form of the invention.

Figure 2—is a fragmentary cross sectional view of one end of the wagon box taken substantially upon the line 2—2 of Figure 1.

Figure 3—is a view similar to Figure 2 of a slightly different form of the present invention, showing the end gate in a raised seat position.

Figure 4—is a view similar to Figure 3, the end gate being shown as partly removed.

Figure 5—is a longitudinal transverse sectional view taken substantially upon the line 5—5 of Figure 3.

Figure 6—is a view similar to Figure 5, being taken on the line 6—6 of Figure 4.

Figure 7—is a perspective view of one of the end gate retaining members employed by me in connection with the form of the invention shown in Figures 3 to 8 inclusive.

Figure 8—is a fragmentary elevational view of the outer side of either the front or rear end gate for the wagon box shown in said Figures 3 to 8 inclusive, and Figure 9—is a fragmentary cross sectional view of one section of the end gate employed in the form of invention disclosed in Figures 1 and 2, means being provided for retaining the end gate sections within the side boards of the wagon box.

Particular reference will first be made to Figures 1, 2 and 9 of the drawings, and in these figures, there is clearly disclosed a wagon box comprising a bottom 5, removable side boards 6 and a front and rear end gate 7 and 8 respectively. The side boards 6 and 7 in this form of the invention comprise sections 9, 10 and 11, the lower section 11 of which is rigidly secured to the opposite edges of the floor 5, and the other sections 9 and 10 being detachably positioned upon this section 11, through the instrumentality of any desirable form of stake and pocket construction denoted in general by 12. In this form of the invention wherein the opposite side boards 6 of the wagon body comprise removable sections, the wagon box is adapted to be used as a grain wagon or the like, and also as a means for transporting live stock, it being at once understood that when the box is to be employed as a grain wagon, the sections 9, 10 and 11 will be positioned as clearly shown in Figures 1 and 2, that is, have close contact with each other. When it is desired to employ the wagon box for transporting live stock, the sections may be separated for consequently increasing the depth of the wagon box.

The front and rear end gates 7 and 8 are identical in construction, the means for retaining the same between the side boards 6—6, also being the same, so for purposes of simplicity it will be understood that a description of one of the end gates together with its holding means will suffice for both. The internal opposite ends of each of the side boards are provided with an end gate holding means or guideway designated in general by the numeral 13, this holding means consisting of alined sections 14, 15 and 16, rigidly secured respectively, to the sections 9, 10 and 11 constituting the side boards 6—6.

Each of these sections of the holding means are formed of strips of sheet metal so bent as to provide a central dove-tail channel 17, and channels 18 upon opposite sides of the dove-tail channel, these latter mentioned channels being formed by bending the ends of the said strip of sheet metal inwardly as at 19, and within these end channels, there are positioned wedge blocks 20, which are more clearly shown in Figure 1. Each of the end gates 7 and 8 also consist of three sections 21, 22 and 23, and upon their opposite ends, are metallic dove-tail shaped heads 24 for slidably positioning within the said dove-tailed channels provided in the holding means 13. The top section 21 of each of the end gates has secured to the upper longitudinal edge thereof, a cross metallic strip 24', the opposite ends of which engage over the sides of the top section 9 of each of the side boards 6, whereby when these top sections are raised upwardly or removed from the wagon box, the top section 21 of each of the end gates will also be consequently likewise moved.

As a means for rigidly maintaining the central sections 22 of each of the end gates within the central sections 10 of the side boards, there is provided as clearly shown in Figure 9, a pin 25 which normally engages through alined openings within the said dove-tailed channel 17 and the dove-tailed head 24, this pin being carried by a spring plate 26, rigidly secured to the outer sides of the said central sections 10, of each of the side boards 6.

In view of the construction shown in Figures 1, 2 and 9, it will at once be apparent that I have provided a front and rear end gate for wagon boxes, wherein these end gates may be advantageously removed and positioned at will, the construction of the end gates being such as to be removed separately of the side board sections or removed together with these side board sections as above described.

Now, having particular reference to Figures 3 to 8 inclusive, the wagon box constitutes a floor board 5', and side boards 6', these side boards consisting of a single section. In this instance, the front and rear end gates together with their holding means are also of identical construction, and I have therefore shown in the drawings, but one end gate. The ends of the side boards 6' are provided with a retaining means for the end gates similar in some instances to the retaining means for the previously described form of the invention. This retaining means includes a strip of metal upon the opposite internal ends of each of the side boards, and being so shaped as to provide a central dove-tailed channel 27, together with end channels 28 formed by bending the ends of the said strip of material inwardly as at 29. In this instance, the channels 28 also receive wedge blocks or cleats 30, and the lower portion of the outer end channels 28 are cut away as clearly shown in the figures for purposes hereinafter described.

The end gates comprise an upper and lower section 31 and 32 respectively, the upper section 31 being provided with dove-tailed heads 33 upon the opposite ends thereof, for sliding engagement within the before mentioned dove-tailed channels of the end gate holding means. The lower section 32 is hingedly secured to the top section 31 as at 32', the cut away portion of the outer channels 28 of the holding means permitting of a free rearwardly swinging movement of the lower section 32 with respect to the upper section 31.

When the sections 31 and 32 of the end gates are positioned between the side boards 6' of the wagon box, it will be seen that the same functions as a highly improved end gate, and as a means for retaining the lower section 32 in vertical alinement with the top section 31, there are provided cam levers 34 upon the outer opposite ends of the lower section 32, these cam levers adapted for swinging movement upon said lower section 32 for permitting of the cam heads thereof engaging within slots 35 within each of the opposite holding means, and in view of the above description, it will at once be apparent that when these cam levers 34 are released, the lower section 32 of the end gates may be swung rearwardly for consequently permitting of a downward sliding movement of the top section 31 to a position as shown in Figure 4, at which time the entire gate may be removed.

While I have herein shown and described the preferred embodiment of the present invention it is nevertheless to be understood that minor changes may be made therein without departing from the spirit and scope of the invention as claimed.

What I claim as new is:—

A wagon box end gate structure comprising plates adapted to be applied to the side boards of the body, said plates being of uniform design and configuration and each plate having a vertically disposed channel adapted to receive a cleat applied to the side boards, the edge of the channel extending the full vertical length of the plate, the plate being provided with a second channel the side edge of which is spaced from the first mentioned channel, the second mentioned channel extending from the upper edge of the plate to a point between the upper and lower edges thereof, the plate being provided at a point below the lower edge of the second mentioned channel with a slot, the second mentioned channel adapted to receive a cleat applied to the side board of the body, and an end gate composed of sections hingedly connected together, the upper section adapted to be received between the said channels and the lower section having upon its outer side cam levers, the cam portions of which are adapted to be swung into the slot of the plate whereby the sections of the end gate are held in vertical alignment between the side boards when the gate is in a closed position and the upper section of the end gate may be retained in a vertical position between the side boards of the body when the cam levers are disengaged from the slot and the lower section of the end gate may swing outwardly with relation to the bottom of the body.

In testimony whereof I affix my signature.

RALPH X. JEFFERIS.